United States Patent
Ahn et al.

(10) Patent No.: US 9,900,084 B2
(45) Date of Patent: Feb. 20, 2018

(54) COMMUNICATION METHOD AND WIRELESS DEVICE IN TDD-BASED WIRELESS COMMUNICATION SYSTEM

(71) Applicant: LG ELECTRONICS INC., Seoul (KR)

(72) Inventors: Joon Kui Ahn, Anyang-si (KR); Dong Youn Seo, Anyang-si (KR); Suck Chel Yang, Anyang-si (KR)

(73) Assignee: LG Electronics Inc., Seoul (KR)

(*) Notice: Subject to any disclaimer, the term of this patent is extended or adjusted under 35 U.S.C. 154(b) by 75 days.

(21) Appl. No.: 14/365,483

(22) PCT Filed: Dec. 18, 2012

(86) PCT No.: PCT/KR2012/011080
§ 371 (c)(1),
(2) Date: Jun. 13, 2014

(87) PCT Pub. No.: WO2013/094967
PCT Pub. Date: Jun. 27, 2013

(65) Prior Publication Data
US 2014/0328229 A1 Nov. 6, 2014

Related U.S. Application Data

(60) Provisional application No. 61/577,656, filed on Dec. 19, 2011, provisional application No. 61/706,090, filed on Sep. 26, 2012.

(51) Int. Cl.
*H04J 3/00* (2006.01)
*H04B 7/26* (2006.01)
*H04W 56/00* (2009.01)

(52) U.S. Cl.
CPC ...... *H04B 7/2656* (2013.01); *H04W 56/0005* (2013.01)

(58) Field of Classification Search
CPC .................. H04B 7/2656; H04W 56/0005
See application file for complete search history.

(56) References Cited

U.S. PATENT DOCUMENTS

| | | | |
|---|---|---|---|
| 2007/0211657 A1 | 9/2007 | McBeath et al. | |
| 2009/0129491 A1 | 5/2009 | Suo et al. | |
| 2010/0091725 A1 | 4/2010 | Ishii | |
| 2010/0278080 A1* | 11/2010 | Pan | H04B 7/2656 370/280 |
| 2010/0284289 A1* | 11/2010 | Suo | H04W 56/002 370/252 |

(Continued)

FOREIGN PATENT DOCUMENTS

KR 10-2011-0132180 A 12/2011

*Primary Examiner* — Ayaz Sheikh
*Assistant Examiner* — Hai-Chang Hsiung
(74) *Attorney, Agent, or Firm* — Dentons US LLP

(57) ABSTRACT

Provided are a communication method and a wireless device in a time division duplex (TDD)-based wireless communication system. A wireless device receives a setting for a first special (S) subframe of a first cell to which a first timing advance (TA) is applied and a setting for a second S subframe of a second cell to which a second TA is applied. When a downlink (DL) reception and an uplink (UL) transmission are duplicated, the wireless device varies at least one of the settings among the first S subframe and second S subframe.

5 Claims, 16 Drawing Sheets

(56) References Cited

U.S. PATENT DOCUMENTS

| | | | |
|---|---|---|---|
| 2010/0316096 A1 | 12/2010 | Adjakple et al. | |
| 2011/0122837 A1* | 5/2011 | Lin | H04B 7/0617 370/329 |
| 2011/0255484 A1 | 10/2011 | Zhang et al. | |
| 2011/0292846 A1* | 12/2011 | Hu | H04W 72/00 370/280 |
| 2011/0317616 A1* | 12/2011 | Seo | H04B 7/15557 370/315 |
| 2012/0014349 A1* | 1/2012 | Chung | H04B 7/0684 370/329 |
| 2012/0164948 A1* | 6/2012 | Narasimha | H04W 72/1215 455/63.1 |
| 2012/0188907 A1* | 7/2012 | Dayal | H04W 72/1215 370/254 |
| 2013/0039193 A1* | 2/2013 | Yin | H04W 72/0486 370/252 |

\* cited by examiner

COMMUNICATION METHOD AND WIRELESS DEVICE IN TDD-BASED WIRELESS COMMUNICATION SYSTEM

This application is a National Stage Application of International Application No. PCT/KR2012/011080, filed Dec. 18, 2012, and claims priority to and the benefit of U.S. Provisional Application Nos. 61/577,656, filed on Dec. 19, 2011, and 61/706,090 filed on Sep. 26, 2012 the disclosures of which are incorporated by reference herein in their entirety.

BACKGROUND OF THE INVENTION

Field of the Invention

The present invention relates to wireless communications, and more particularly, to a communication method in a time division duplex (TDD)-based wireless communication system, and a wireless device using the method.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

To decrease an interference caused by uplink transmission between user equipments (UEs), it is important for a base station (BS) to maintain an uplink time alignment of the UEs. The UE may be located in any area in a cell. An uplink signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that uplink signals transmitted by the UEs in the cell can be received every time within a boundary. The BS has to properly adjust transmission timing of each UE according to a situation of each UE. Such an adjustment is called an uplink time alignment. A random access process is one of processes for maintaining the uplink time alignment. The UE acquires a time alignment value (or also referred to as a timing advance (TA)) through the random access process, and maintains the uplink time alignment by applying the time alignment value.

When it is said that a UE supports a half duplex operation in time division duplex (TDD), it implies that uplink (UL) transmission and downlink (DL) reception are both possible, but only one of the UL transmission and the DL reception can be performed at one time. If the half duplex operation of the UE is guaranteed, an interference between a UL transmission signal and a DL reception signal can be avoided, and a burden of using a full duplex module which is relatively expensive can be decreased.

Recently, a plurality of serving cells are introduced to provide a higher data rate. For a reason of a frequency feature, coverage, or the like among the plurality of serving cells, the plurality of serving cells to which different time alignment values are applied may be configured. Accordingly, DL reception and UL transmission may overlap at a specific time point, which implies that the half duplex operation cannot be guaranteed for a UE.

SUMMARY OF THE INVENTION

The present invention provides a method of guaranteeing a half duplex operation of a wireless device in a wireless communication system based on time division duplex (TDD) in which a plurality of cells are configured.

In an aspect, a communication method in a time division duplex (TDD)-based wireless communication system is provided. The method includes receiving, by a wireless device, a configuration of a first special (S) subframe for a first cell to which a first timing advance (TA) is applied and a configuration of a second S subframe for a second cell to which a second TA is applied, and changing, by the wireless device, at least one configuration of the first S subframe and the second S subframe when a downlink (DL) reception and an uplink (UL) transmission overlap.

The S subframe may include a downlink pilot time slot (DwPTS) and an uplink pilot time slot (UpPTS), and at least any one of a size of the DwPTS and a size of the UpPTS may be different in the first S subframe and the second S subframe.

In another aspect, a wireless device in a time division duplex (TDD)-based wireless communication system is provided. The wireless device includes a radio frequency (RF) unit configured to transmit and receive a radio signal, and a processor operatively coupled to the RF unit and configured to receive a configuration of a first special (S) subframe for a first cell to which a first timing advance (TA) is applied and a configuration of a second S subframe for a second cell to which a second TA is applied and change at least one configuration of the first S subframe and the second S subframe when a downlink (DL) reception and an uplink (UL) transmission overlap.

A half duplex operation of a wireless device can be guaranteed even if different time division duplex (TDD) configurations are configured to a plurality of cells.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) or 3GPP LTE-advanced (LTE-A). This is for exemplary purposes only, and the present invention is also applicable to various wireless communication systems. In the following description, LTE and/or LTE-A are collectively referred to as LTE.

Figure 1:
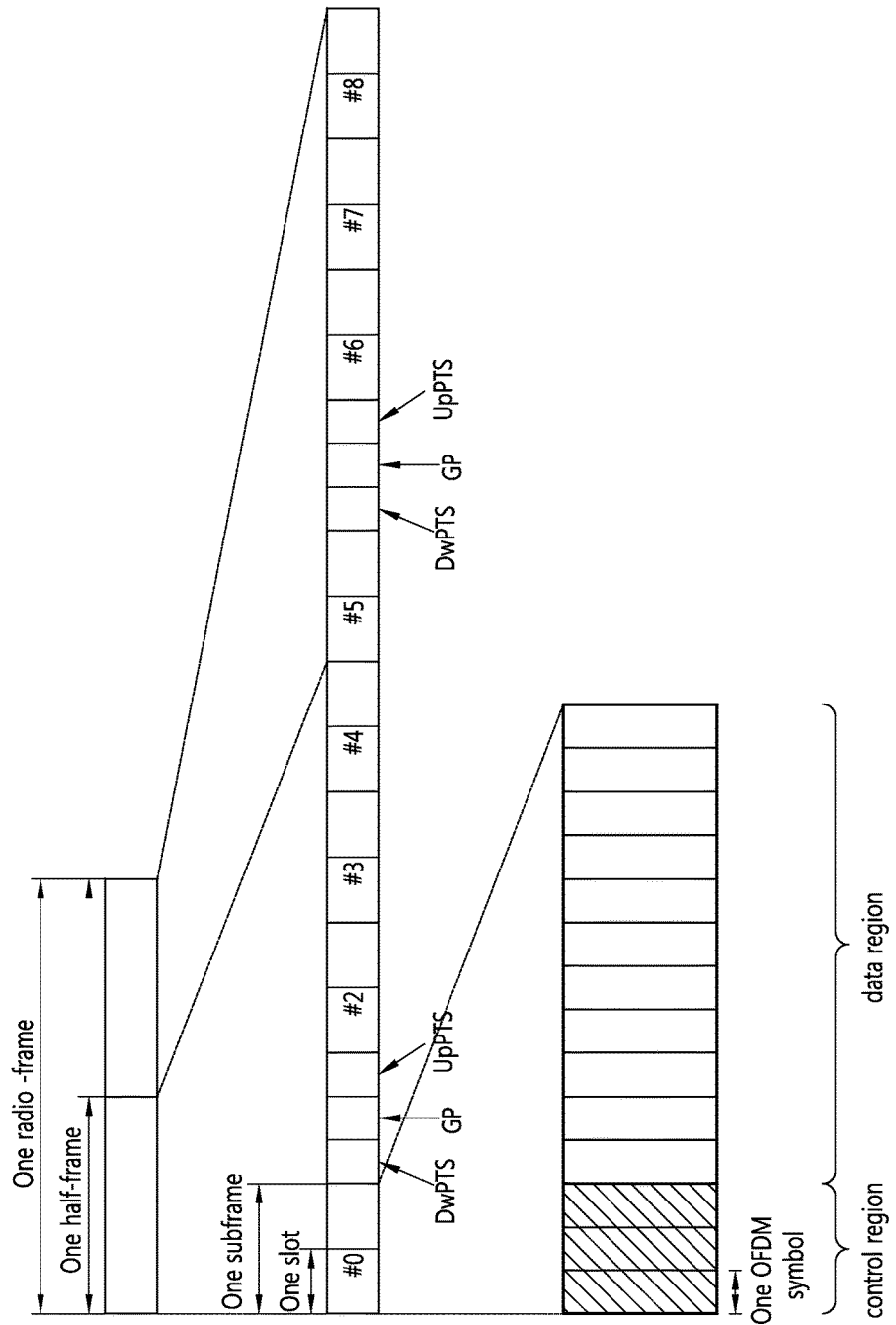
FIG. 1 shows a downlink (DL) radio frame structure in $3^{rd}$ generation partnership project (3GPP) long term evolution (LTE).

FIG. 1 shows a structure of a downlink radio frame in 3GPP LTE. The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special (S) subframe, and includes a downlink pilot time slot (DwPTS), a guard period (GP), and an uplink pilot time slot (UpPTS). The DwPTS is used in a wireless device for initial cell search, synchronization, or channel estimation. The UpPTS is used in a BS for a channel estimation and uplink transmission time alignment of the wireless device. The GP is a period for removing an interference which occurs in an uplink due to a multi-path delay of a downlink signal between the uplink and a downlink, and is called a gap.

In TDD, a downlink (DL) subframe and an uplink (UL) subframe coexist in one radio frame. Table 1 below shows an example of a radio frame configuration.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe, and 'S' denotes an S subframe. Upon receiving the DL-UL configuration from the BS, the wireless device can know which subframe is a DL subframe or a UL subframe according to the radio frame configuration.

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a first OFDM symbol of the subframe carries a control format indicator (CFI) regarding the number of OFDM symbols (i.e., a size of the control region) used for transmission of control channels in the subframe. The wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARM). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

According to 3GPP TS 36.211 V8.7.0, the uplink channel includes a PUSCH, a PUCCH, a sounding reference signal (SRS), and a physical random access channel (PRACH).

The PUCCH supports multiple formats. A PUCCH having a different number of bits per subframe can be used according to a modulation scheme which is dependent on the PUCCH format. The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

Now, maintaining of a UL time alignment in 3GPP LTE will be described.

To decrease an interference caused by UL transmission between UEs, it is important for a BS to maintain a UL time alignment of the UEs. The UE may be located in any area in a cell. A UL signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that UL signals transmitted by the UEs in the cell can be received every time within a boundary. The BS has to properly adjust transmission timing of each UE according to a situation of each UE. Such an adjustment is called a time alignment maintenance.

A random access procedure is one of methods for managing the time alignment. The UE transmits a random access preamble to the BS. The BS calculates a time alignment value for advancing or delaying transmission timing of the UE on the basis of the received random access preamble. In addition, the BS transmits a random access response including the calculated time alignment value to the UE. The UE updates the transmission timing by using the time alignment value.

In another method, the BS receives a sounding reference signal from the UE periodically or randomly, calculates the time alignment value of the UE by using the sounding reference signal, and reports a MAC control element (CE) to the UE.

The time alignment value is information sent by the BS to the UE to maintain uplink time alignment. A timing alignment command indicates this information.

Since the UE has a mobility in general, the transmission timing of the UE varies depending on a speed, location, or the like of the moving UE. Therefore, the time alignment value received by the UE is preferably valid during a specific time period. For this, a time alignment timer is used.

When the time alignment is updated after receiving the time alignment value from the BS, the UE starts or restarts the time alignment timer. The UE can perform UL transmission only when the time alignment timer is running. A value of the time alignment timer may be reported by the BS to the UE by using system information or an RRC message such as a radio bearer reconfiguration message.

When the time alignment timer expires or when the time alignment timer does not run, the UE does not transmit any uplink signal except for the random access preamble under the assumption that time alignment is not achieved between the BS and the UE.

Figure 2:
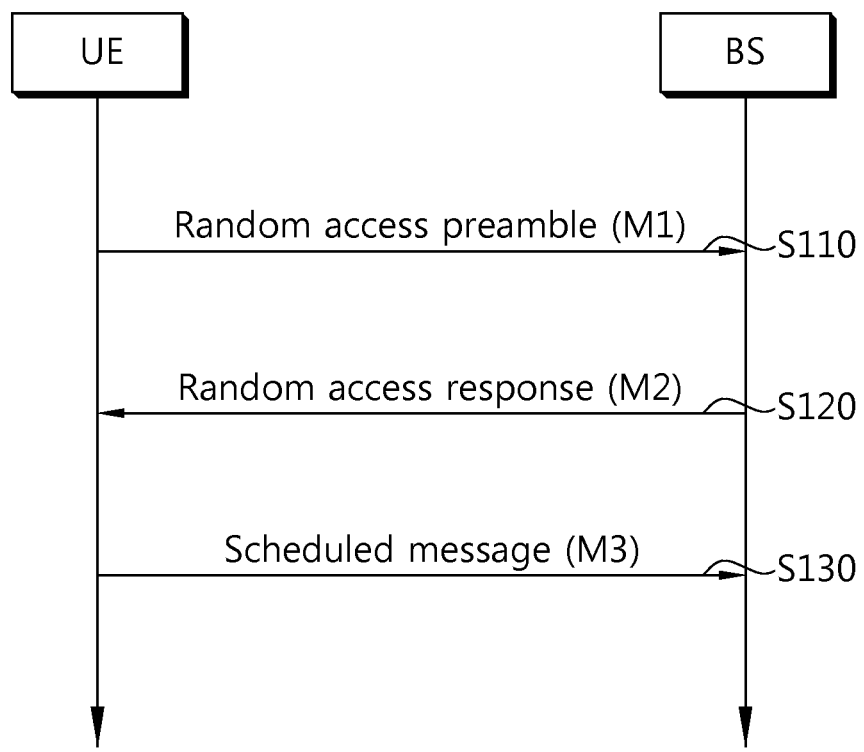
FIG. 2 is a flowchart showing a random access procedure in 3GPP LTE.

FIG. 2 is a flowchart showing a random access procedure in 3GPP LTE. The random access procedure is used by a UE to acquire a UL time alignment with a BS or to allocate a UL radio resource.

The UE receives a root index and a physical random access channel (PRACH) configuration index from the BS. Each cell has 64 candidate random access preambles defined by a Zadoff-Chu (ZC) sequence. The root index is a logical index for generating the 64 candidate random access preambles by the UE.

The random access preamble is limited to a specific time and frequency resource for each cell. The PRACH configuration index indicates a specific subframe and preamble format capable of transmitting the random access preamble.

Following table shows an example of random access configurations disclosed in section 5.7 of 3GPP TS 36.211 V8.7.0

TABLE 2

| PRACH configuration index | Preamble format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

The UE transmits a randomly selected random access preamble to the BS (step S110). The UE selects one of the 64 candidate random access preambles. In addition, the UE selects a corresponding subframe by using the PRACH configuration index. The UE transmits the selected random access preamble in the selected subframe.

Upon receiving the random access preamble, the BS transmits a random access response (RAR) to the UE (step S120). The RAR is detected in two steps. First, the UE detects a PDCCH masked with a random access-RNTI (RA-RNTI). The UE receives the RAR included in a medium access control (MAC) protocol data unit (PDU) through a PDSCH indicated by the detected PDCCH.

Figure 3:
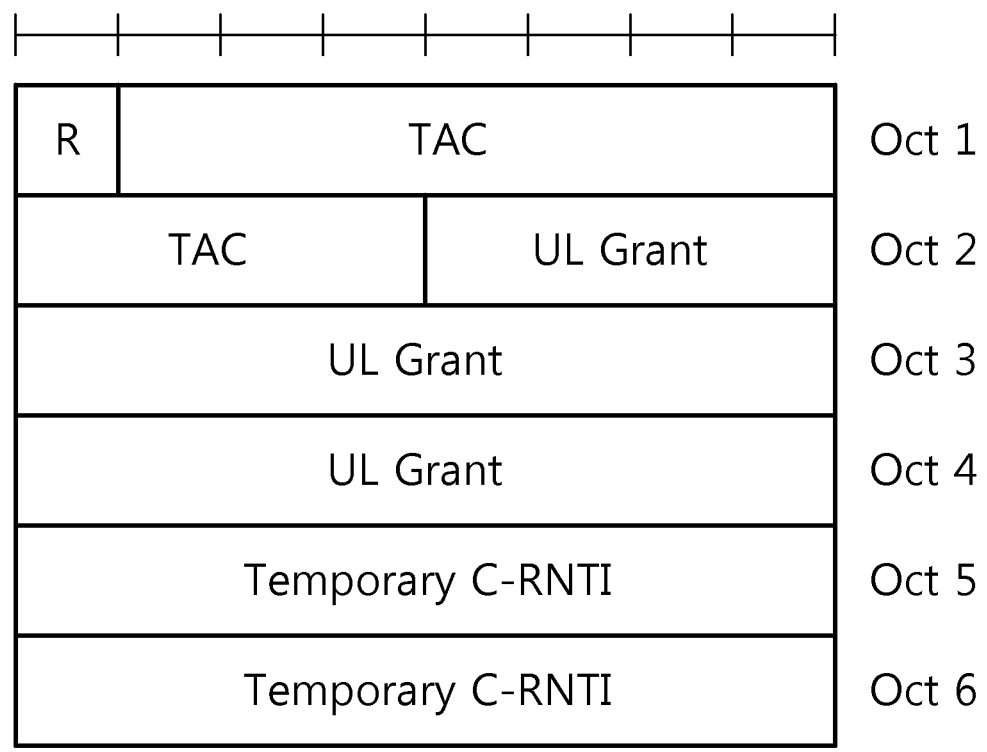
FIG. 3 shows an example of a random access response.

FIG. 3 shows an example of a random access response (RAR).

The RAR may include a TAC, a UL grant, and a temporary C-RNTI.

The TAC is information indicating a time alignment value sent by a BS to a UE to maintain a UL time alignment. The UE updates UL transmission timing by using the time alignment value. When the UE updates the time alignment, a time alignment timer starts or restarts.

The UL grant includes a UL resource assignment and a transmit power command (TPC) used to transmit a scheduling message described below. The TPC is used to determine transmit power for a scheduled PUSCH.

Referring back to FIG. 2, the UE transmits a scheduled message to the BS according to a UL grant included in the RAR (step S130).

Hereinafter, a random access preamble may be referred to as a M1 message, a random access response may be referred to as a M2 message, and a random access scheduled message may be referred as a M3 message.

Now, a multiple carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or also referred to as bandwidth aggregation or carrier aggregation) supports multiple CCs. For example, if 5 CCs are assigned as a granularity of a carrier unit having a bandwidth of 20 MHz, a bandwidth of up to 100 MHz can be supported.

One DL CC or a pair of a UL CC and a DL CC can be mapped to one cell. Therefore, when a UE communicates with a BS through multiple CCs, it can be said that the UE receives a service from multiple serving cells.

Figure 4:
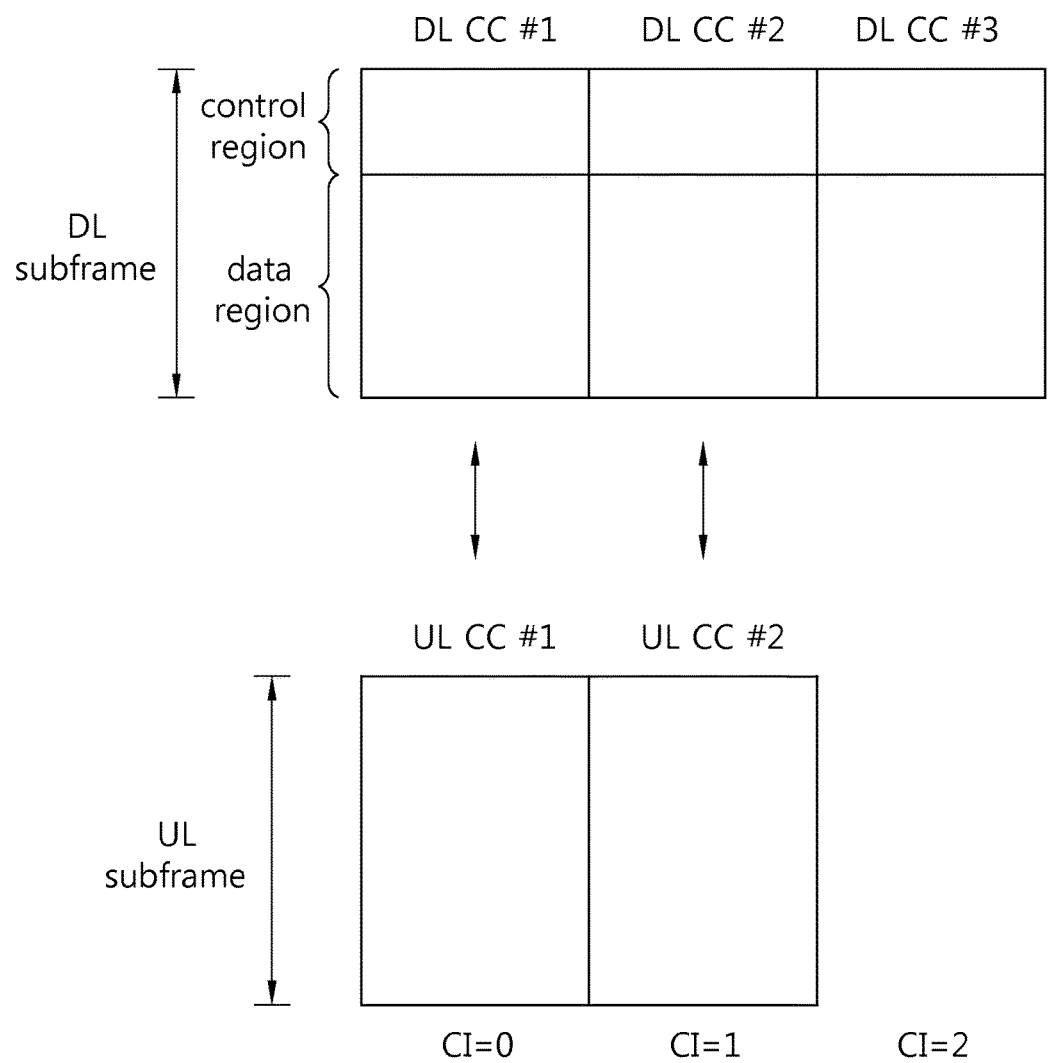
FIG. 4 shows an example of multiple carriers.

FIG. 4 shows an example of multiple carriers.

Although 3 DL CCs and 3 UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since 3 DL CC-UL CC pairs are defined, it can be said that a UE receives a service from 3 serving cells.

The UE may monitor the PDCCH in multiple DL CCs, and may receive a DL transport block simultaneously via the multiple DL CCs. The UE may transmit multiple UL transport blocks simultaneously via multiple UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell (or pcell) and a secondary cell (or scell). The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., RRC messages).

The CI of the primary cell may be fixed. For example, a lowest CI may be designated as a CI of the primary cell. It is assumed hereinafter that the CI of the primary cell is 0 and a CI of the secondary cell is allocated sequentially starting from 1.

The UE may monitor a PDCCH through multiple serving cells. However, even if there are N serving cells, a BS may be configured to monitor the PDCCH for M (M≤N) serving cells. In addition, the BS may be configured to preferentially monitor the PDCCH for L (L≤M≤N) serving cells.

In the conventional 3GPP LTE, even if the UE supports multiple CCs, one timing alignment (TA) value is commonly applied to the multiple CCs. However, a propagation property may change since the multiple CCs are spaced apart from each other to a great extent in a frequency domain. For example, a remote radio header (RRH) and devices may exist in an area of the BS to extend a coverage or to remove a coverage hole.

Figure 5:
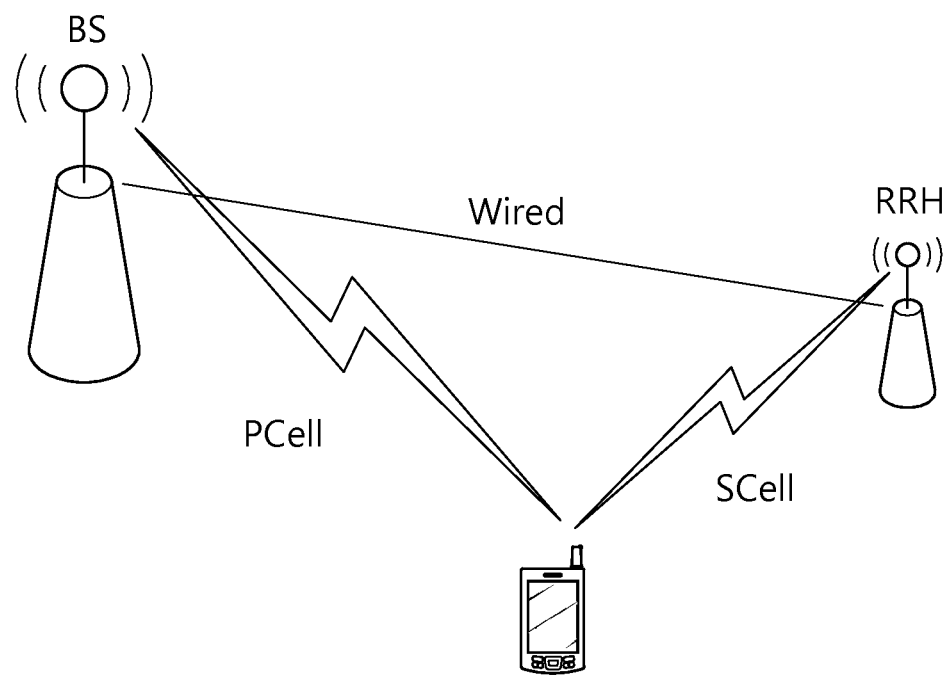
FIG. 5 shows an uplink (UL) propagation difference among a plurality of cells.

FIG. 5 shows a UL propagation difference among multiple cells.

A UE is served by a primary cell and a secondary cell. The primary cell provides a service by using a BS, and the secondary cell provides a service by using an RRH coupled to the BS. A propagation delay property of the primary cell may be different from a propagation delay property of the secondary cell due to a distance between the BS and the RRH, a processing time of the RRH, etc.

In this case, if the same TA value is applied to the primary cell and the secondary cell, it may have a significant effect on a time alignment of a UL signal.

Figure 6:
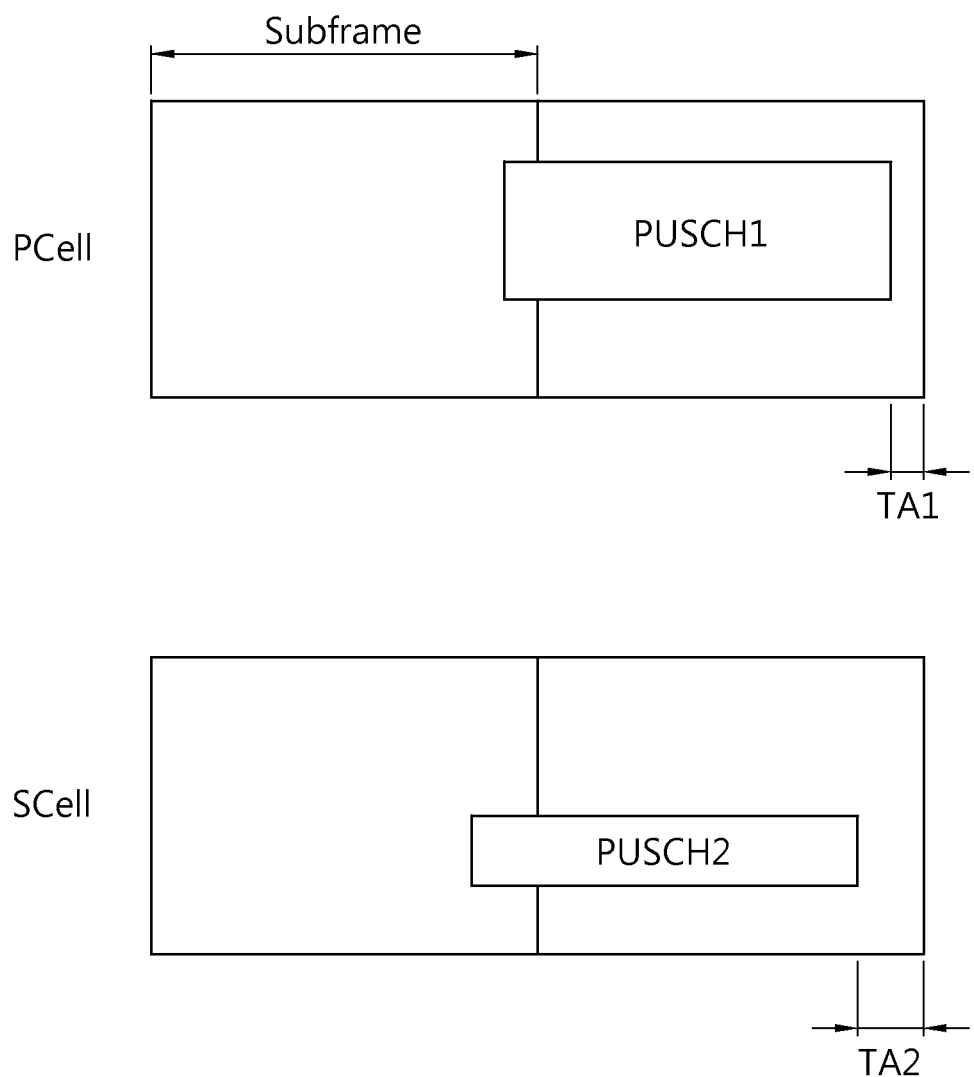
FIG. 6 shows an example in which a timing alignment (TA) varies among a plurality of cells.

FIG. 6 shows an example in which a TA varies among multiple cells in uplink transmission.

An actual TA of a primary cell is 'TA 1', and an actual TA of a secondary TA is 'TA 2'. Therefore, it is necessary to apply an independent TA for each serving cell.

To apply the independent TA, a TA group is defined. The TA group includes one or more cells to which the same TA is applied. The TA is allocated for each TA group, and a time alignment timer runs for each TA group.

Hereinafter, two serving cells, i.e., a first serving cell and a second serving cell, are considered, and it is assumed that the first serving cell belongs to a first TA group, and the second serving cell belongs to a second TA group. The number of serving cells and TA groups are for exemplary purposes only. The first serving cell may be the primary cell or the secondary cell, and the second serving cell may be the primary cell or the secondary cell.

The TA group may include at least one serving cell. Information regarding the configuration of the TA group may be reported by a BS to a UE.

Now, a method of allocating a plurality of UL TAs to a wireless device proposed in the present invention and an operation depending on a configuration of the plurality of TAs will be described in detail.

For clear explanation, it is described that different TAs are applied to two cells for example. However, the number of cells is for exemplary purposes only, and a cell may be replaced with a TA group.

In the following drawing, 'BS TX c1' denotes transmission of a BS in a $1^{st}$ cell, 'BS RX c1' denotes reception of the BS in the $1^{st}$ cell, 'BS TX c2' denotes transmission of the BS in a $2^{nd}$ cell, and 'BS RX c2' denotes reception of the BS in the $2^{nd}$ cell. 'WD TX c1' denotes transmission of a wireless device in the $1^{st}$ cell, 'WD RX c1' denotes reception of the wireless device in the $1^{st}$ cell, 'WD TX c2' denotes transmission of the wireless device in the $2^{nd}$ cell, and 'WD RX c2' denotes reception of the wireless device in the $2^{nd}$ cell. 'D' denotes a DL subframe, and 'U' denotes a UL subframe.

Figure 7:
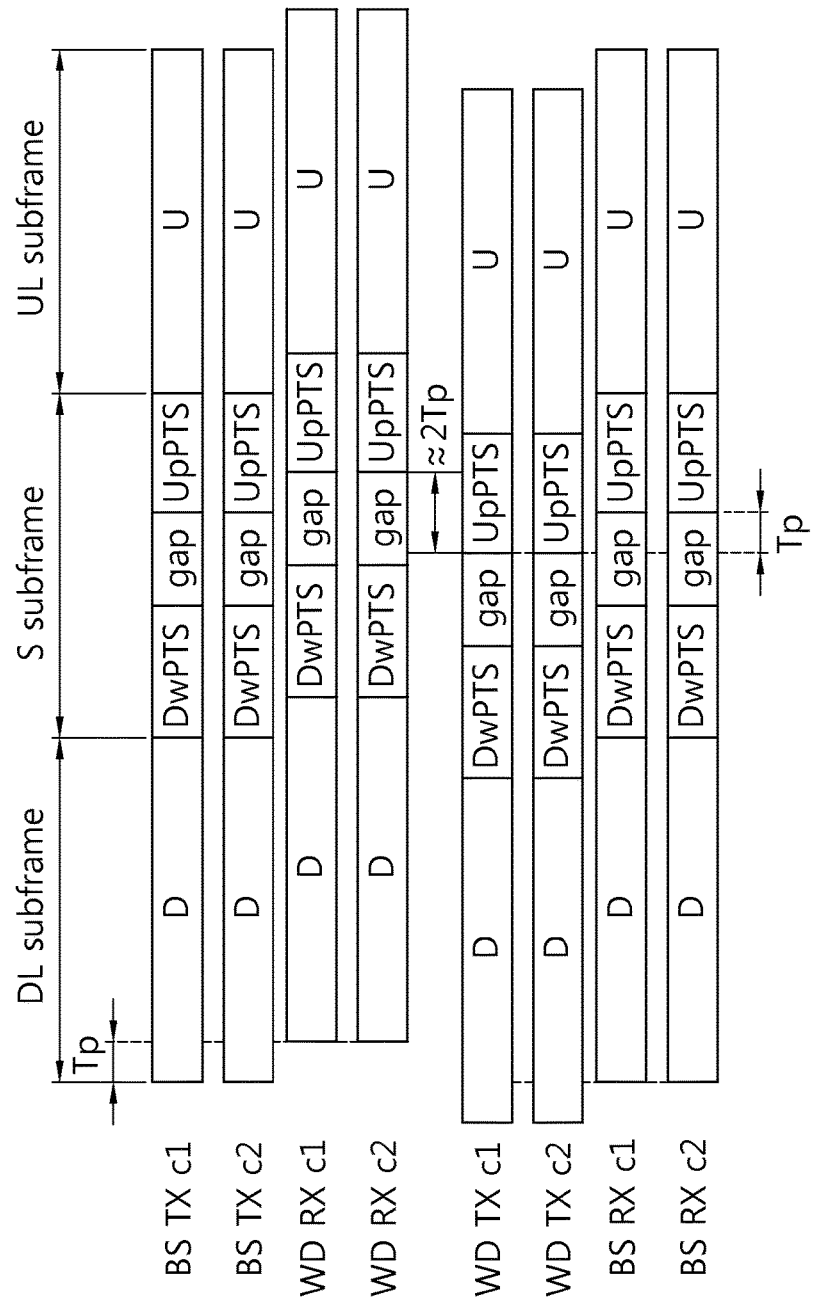
FIG. 7 shows an example of transmission (TX) timing of a base station (BS) for two cells when a propagation delay is identical between the BS and a wireless device.

FIG. 7 shows an example of TX timing of a BS for two cells when a propagation delay is identical between the BS and a wireless device.

As well known, an S subframe is placed between a DL subframe and a UL subframe in a 3GPP LTE TDD system. The S subframe performs a function of avoiding an overlapping of DL signal reception and UL signal transmission due to a propagation delay between the BS and the wireless device. A first portion (called DwPTS) of the S subframe is used for DL transmission, an end portion (called UpPTS) thereof is used for UL transmission, and a gap is placed to an intermediary portion thereof.

If the propagation delay is identical between the BS and the wireless device, a TX signal of the BS is received by the wireless device by being delayed by a propagation delay of Tp. A boundary of a subframe transmitted by the wireless device may be advanced approximately by 2Tp from a subframe received from the BS, so that RX timing from all wireless devices are adjusted to TX timing thereof from a perspective of the BS.

In general, even if being advanced by about 2Tp, a size of the gap is greater than 2Tp, and thus DL reception and UL transmission do not overlap from a perspective of the wireless device. This implies that the wireless device can perform a half duplex operation in TDD. That is, although the wireless device can perform both the UL transmission and the DL reception, only one of the UL transmission and the DL reception can be performed at one time. When the half duplex operation of the wireless device is guaranteed, an interference can be avoided between a TX signal and RX signal of the wireless device, and a burden of using a full duplex module which is relatively expensive can be decreased.

However if a plurality of cells (or a plurality of TA groups) having different TAs are configured to the wireless device, TX timing of the BS for the plurality of cell and RX/TX timing of the wireless device may vary, which may lead to a problem in that the half duplex operation cannot be guaranteed. Examples thereof are shown in FIGS. 8, 9, and 10.

Figure 8:
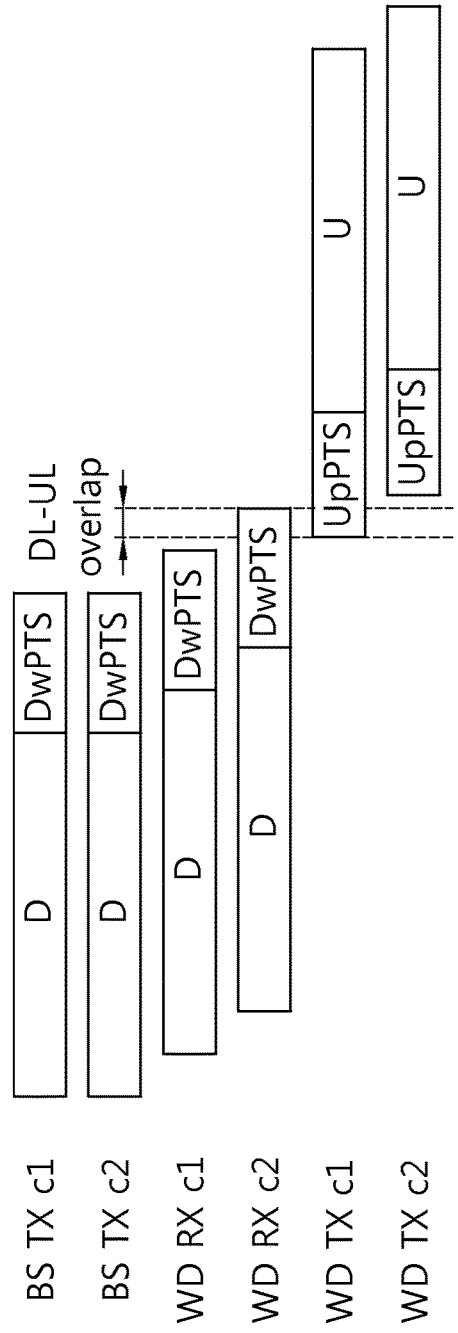
FIG. 8 shows an example in which TX timing is identical for two cells but reception (RX) timing of a wireless device is different.

FIG. 8 shows an example in which TX timing is identical for two cells but RX timing of a wireless device is different.

A proper TA is applied to each of a $1^{st}$ cell and a $2^{nd}$ cell to maintain a half duplex operation. However, a DwPTS duration received by the wireless device in the $2^{nd}$ cell overlaps with an UpPTS duration transmitted in the $1^{st}$ cell. This implies that the wireless device cannot maintain the half duplex operation across two cells.

Figure 9:
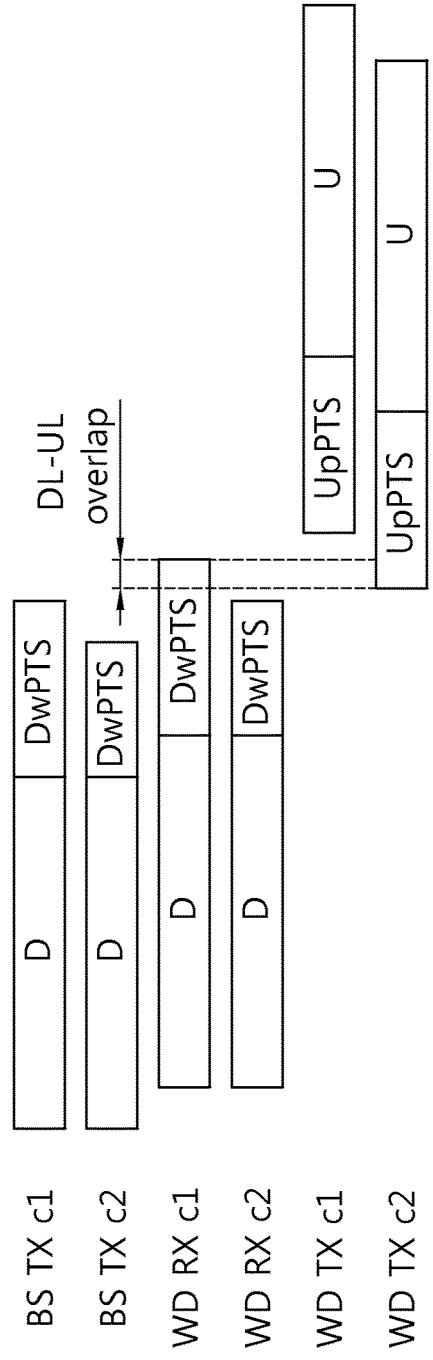
FIG. 9 shows an example in which TX timing for two cells and RX timing of a wireless device are identical but a downlink pilot time slot (DwPTS) duration configured to each cell is different.
Figure 10:
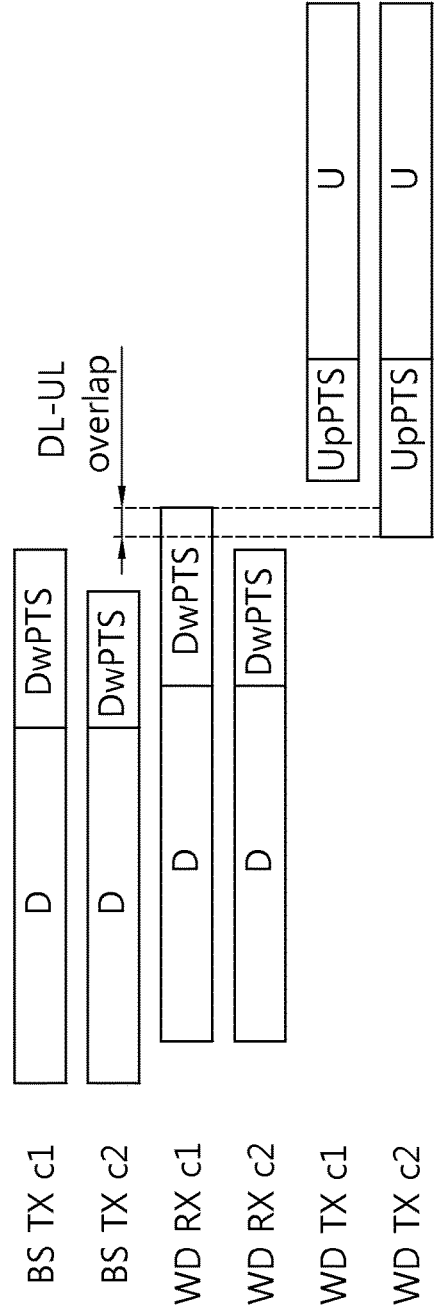
FIG. 10 shows an example in which TX timing for two cells and RX timing of a wireless device are identical but a size of a DwPTS duration and a size of an uplink pilot time slot (UpPTS) duration are set differently to each cell.

FIG. 9 shows an example in which TX timing for two cells and RX timing of a wireless device are identical but a DwPTS duration configured to each cell is different. The size of the DwPTS duration may vary due to a difference of a coverage or the like supported by each cell.

It shows that a DwPTS duration received by the wireless device in the $1^{st}$ cell overlaps with an UpPTS duration transmitted in the $2^{nd}$ cell, and thus the half duplex operation cannot be maintained.

FIG. 10 shows an example in which TX timing for two cells and RX timing of a wireless device are identical but a size of a DwPTS duration and a size of an UpPTS duration are set differently to each cell. The size of the DwPTS duration and the size of the UpPTS duration may vary due to a difference of a coverage or the like supported by each cell.

It shows that a DwPTS duration received by the wireless device in the $1^{st}$ cell overlaps with an UpPTS duration transmitted in the $2^{nd}$ cell, and thus the half duplex operation cannot be maintained.

Hereinafter, it is proposed a method for avoiding an overlapping of DL/UL signals due to different RX timing, different TX timing, different coverage, etc., for a plurality of cells, and for guaranteeing a half duplex operation of a wireless device.

First, it is proposed a method of guaranteeing a half duplex operation by regulating DL transmission of a BS.

The BS may not transmit the entirety or part (this is called a DL overlapping signal) of a BS's TX signal which may overlap with TX timing of the wireless device. The DL overlapping signal may not be transmitted for a corresponding wireless device or for the entire cell.

The BS may report to the wireless device about information regarding the DL overlapping signal or information regarding whether to transmit the DL overlapping signal by using an RRC message or a MAC message. The RRC message or the MAC message may be a message specific to the wireless device, or may be a broadcast message.

A more specific example is as follows.

Figure 11:
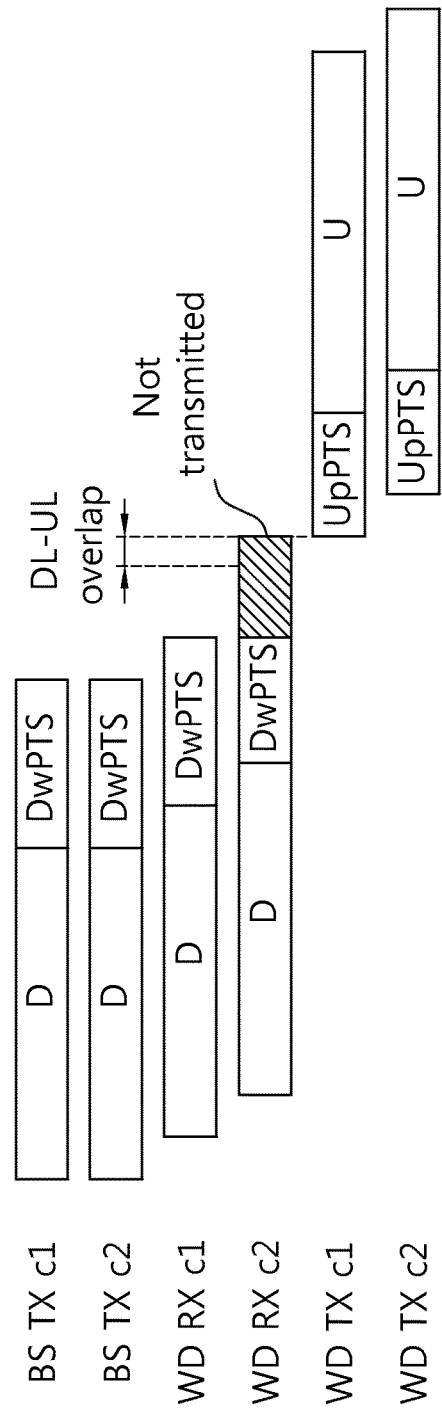
FIG. 11 shows a method according to an embodiment of the present invention.

FIG. 11 shows a method according to an embodiment of the present invention.

ABS may determine the number of OFDM symbols belonging to a DwPTS duration of a cell having the DwPTS duration which may overlap with TX timing of a wireless device among cells assigned to the wireless device such that the number is less than that determined in the cell as to the wireless device.

If an RX end time of a DwPTS duration is different in each of a plurality of cells, a DwPTS RX end time of the remaining cells may be adjusted according to a fastest DwPTS RX end time. For example, the RX end time may be adjusted on an OFDM symbol basis. This may be based on a configuration of the BS, or may be autonomously adjusted by the wireless device.

For example, assume that a DwPTS duration received in a $2^{nd}$ cell overlaps with an UpPTS duration transmitted in a $1^{st}$ cell, and a DwPTS RX end time is faster in the $1^{st}$ cell than in the $2^{nd}$ cell. A DL/UL overlapping may be avoided by adjusting the DwPTS RX end time of the $2^{nd}$ cell to the DwPTS RX end time of the $1^{st}$ cell.

Figure 12:
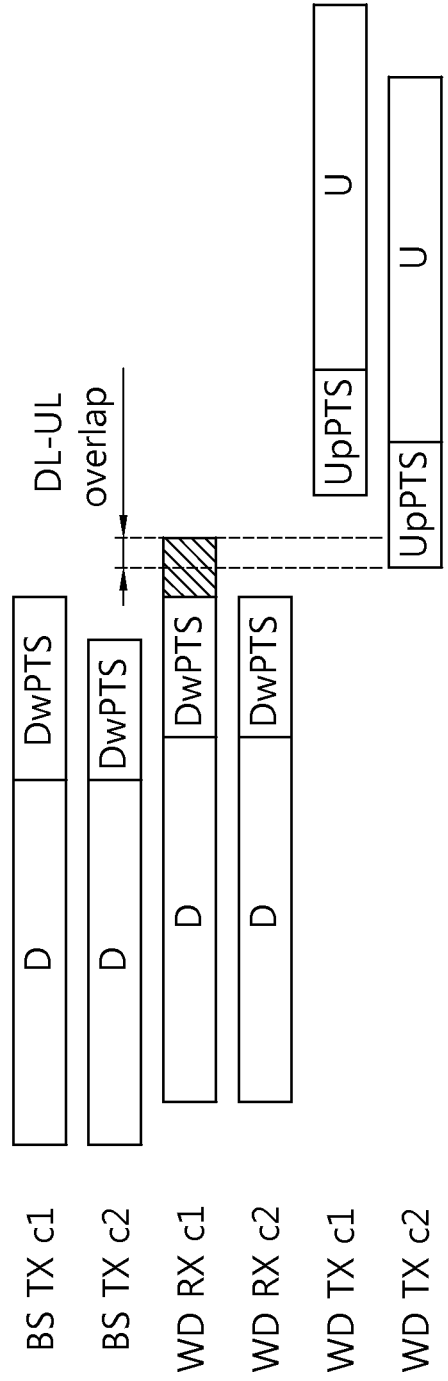
FIG. 12 shows a method according to another embodiment of the present invention.

FIG. 12 shows a method according to another embodiment of the present invention.

When a size of a DwPTS duration is different in each of a plurality of cells, the size of the DwPTS duration of all of the cells is adjusted to a size of a shortest DwPTS duration.

For example, assume that a DwPTS duration received in a $1^{st}$ cell overlaps with a DwPTS duration transmitted in a $2^{nd}$ cell, and a size of the DwPTS is the smallest in the $1^{st}$ cell. A DL/UL overlapping may be avoided by adjusting a size of the DwPTS duration of the $2^{nd}$ cell to the size of the DwPTS duration of the $1^{st}$ cell.

The DwPTS duration may be divided into a control region in which a control channel (e.g., PDCCH, PCFICH, PHICH) is transmitted and a data region in which PDSCH or the like is transmitted. A BS may not transmit the PDSCH in the DwPTS duration to a wireless device which has a DL/UL overlapping problem. That is, the wireless device may assume that the PDSCH is not transmitted in a corresponding S subframe, or a PDSCH for scheduling the PDSCH is not transmitted. In this case, since transmission of a reference signal can be skipped, the wireless device may not perform measurement or channel estimation on a data region of the DwPTS duration or on the entire portion of the DwPTS duration.

Next, it is proposed a method of guaranteeing a half duplex operation by adjusting UL transmission of the wireless device, separately from an adjustment of DL transmission of a BS or together with the adjustment of the DL transmission.

The wireless device may not transmit the entirety or part of a TX signal which may overlap with RX timing from the BS (such a signal is called a UL overlapping signal). The BS may report information regarding whether the wireless device will transmit the UL overlapping signal by using an RRC message or an MAC message. The RRC message or the MAC message may be a message specific to the wireless device, or may be a broadcast message.

Figure 13:
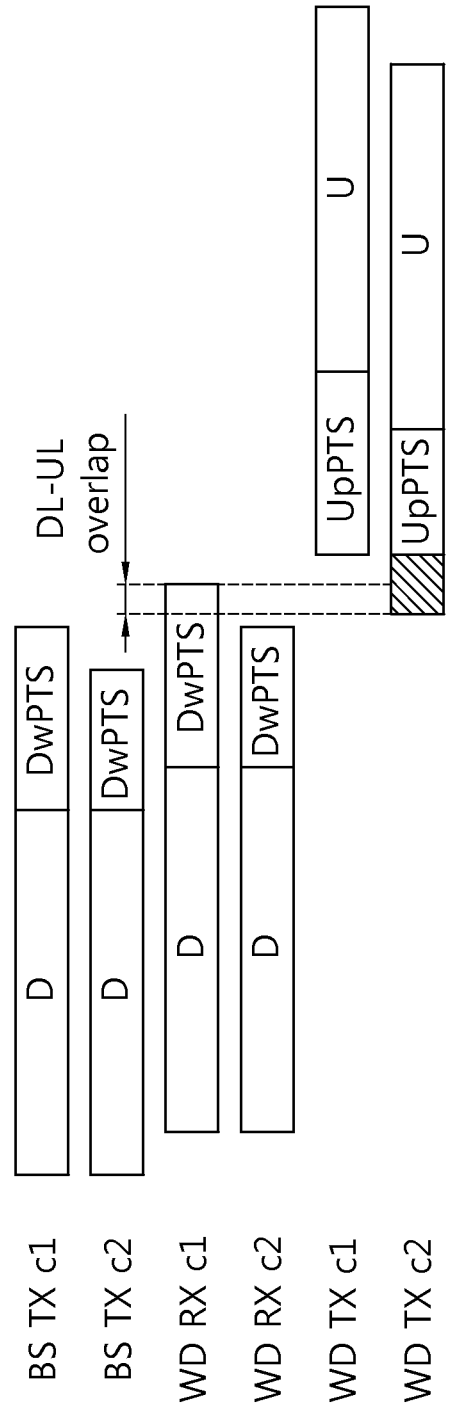
FIG. 13 shows a method according to another embodiment of the present invention.

FIG. 13 shows a method according to another embodiment of the present invention.

A wireless device may determine the number of OFDM symbols, which belong to an UpPTS duration of a cell, to a value less than a determined number, when the cell has an UpPTS duration which may overlap with RX timing from a BS among a plurality of configured cells.

If a TX start time of the UpPTS duration is different in each of a plurality of cells, an UpPTS TX start time of the remaining cells may be adjusted according to a slowest UpPTS TX start time. For example, the TX start time may be adjusted on an OFDM symbol basis. This may be based on a configuration of the BS, or may be autonomously adjusted by the wireless device.

For example, assume that a DwPTS duration received in a $1^{st}$ cell overlaps with an UpPTS duration transmitted in a $2^{nd}$ cell, and an UpPTS TX start time is slower in the $1^{st}$ cell than in the $2^{nd}$ cell. A DL/UL overlapping may be avoided by adjusting the UpPTS TX start time of the $2^{nd}$ cell to the UpPTS TX start time of the $1^{st}$ cell.

Figure 14:
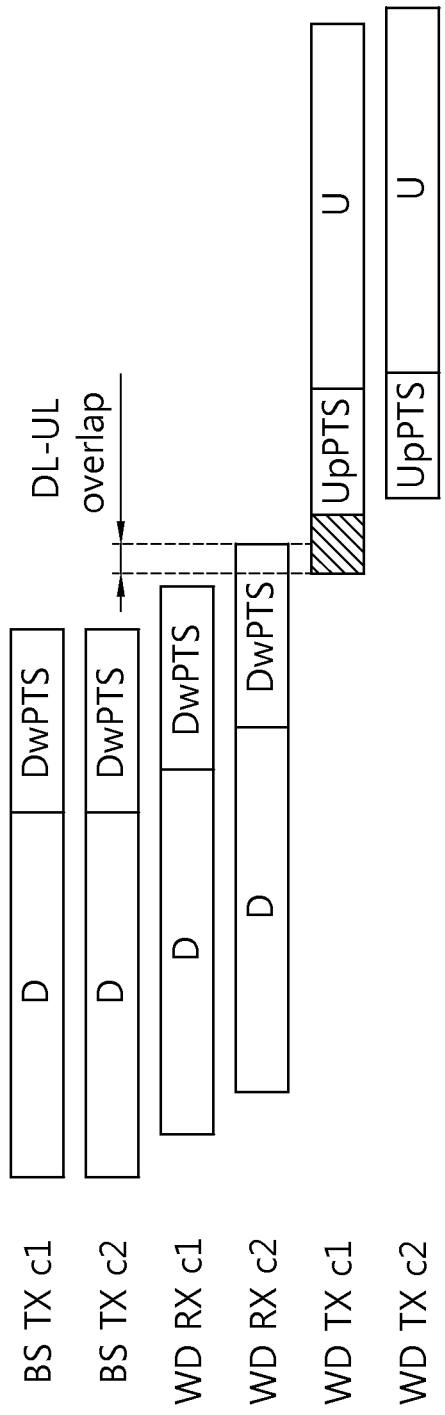
FIG. 14 shows a method according to another embodiment of the present invention.

FIG. 14 shows a method according to another embodiment of the present invention.

When a size of an UpPTS duration is different in each of a plurality of cells, the size of the UpPTS duration of all of the cells is adjusted to a size of a shortest UpPTS duration.

For example, assume that an UpPTS duration received in a $2^{nd}$ cell overlaps with an UpPTS duration transmitted in a $1^{st}$ cell, and a size of the UpPTS is the smallest in the $2^{nd}$ cell. A DL/UL overlapping may be avoided by adjusting a size of the UpPTS duration of the $1^{st}$ cell to the size of the UpPTS duration of the $2^{nd}$ cell.

In the UpPTS duration, a random access preamble or an SRS may be transmitted. A wireless device which may overlap in DL/UL may assume that the random access preamble or the SRS is not transmitted in an S subframe. Even if the random access preamble or the SRS is triggered in the S subframe, the wireless device may not transmit the random access preamble or the SRS. Alternatively, the random access preamble or the SRS may be transmitted only in some of a plurality of OFDM symbols (e.g., last one OFDM symbol) in the UpPTS duration.

If the S subframe is configured as a subframe in which the random access preamble or the SRS is transmitted, instead of reducing or restricting the UpPTS duration, the aforementioned DwPTS duration may be reduced or restricted.

In the implementation of the above methods, a BS may determine a size of the DwPTS duration, a size of a gap, a size of the UpPTS duration in the S subframe of each cell. The size of the DwPTS duration, the size of the gap, and the size of the UpPTS duration may be defined as the number of OFDM symbols. In this case, a determined size in each cell and a size for a specific wireless device affected by a DL/UL overlapping may be configured independently.

The wireless device may transmit to the BS whether a DL/UL signal overlaps in the BS and/or a message including information regarding a size of an overlapping duration.

Figure 15:
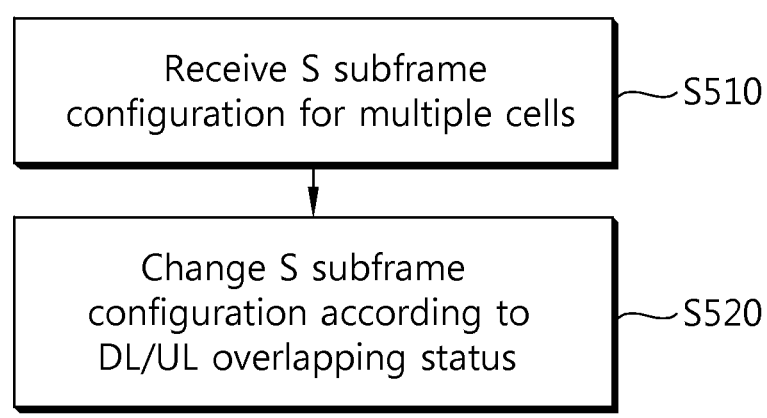
FIG. 15 is a flowchart showing a communication method according to an embodiment of the present invention.

FIG. 15 is a flowchart showing a communication method according to an embodiment of the present invention.

In step S510, a wireless device receives an S subframe configuration for a plurality of cells. For example, the wireless device may receive a $1^{st}$ S subframe configuration for a $1^{st}$ cell to which a $1^{st}$ TA is applied and a $2^{nd}$ S subframe configuration for a $2^{nd}$ cell to which a $2^{nd}$ TA is applied. At least any one of a size of the DwPTS and a size of the UpPTS may be different in the $1^{st}$ subframe and the $2^{nd}$ subframe.

In step S520, the wireless device changes the S subframe configuration according to a DL/UL overlapping status. If a DL reception and a UL transmission overlap and thus a half duplex operation cannot be performed, the wireless device may change at least any one of the $1^{st}$ S subframe and the $2^{nd}$ S subframe.

According to at least any one of the aforementioned embodiments of FIG. 11 to FIG. 14, the wireless device may change at least any one of the size of the DwPTS and the size of the UpPTS.

Figure 16:
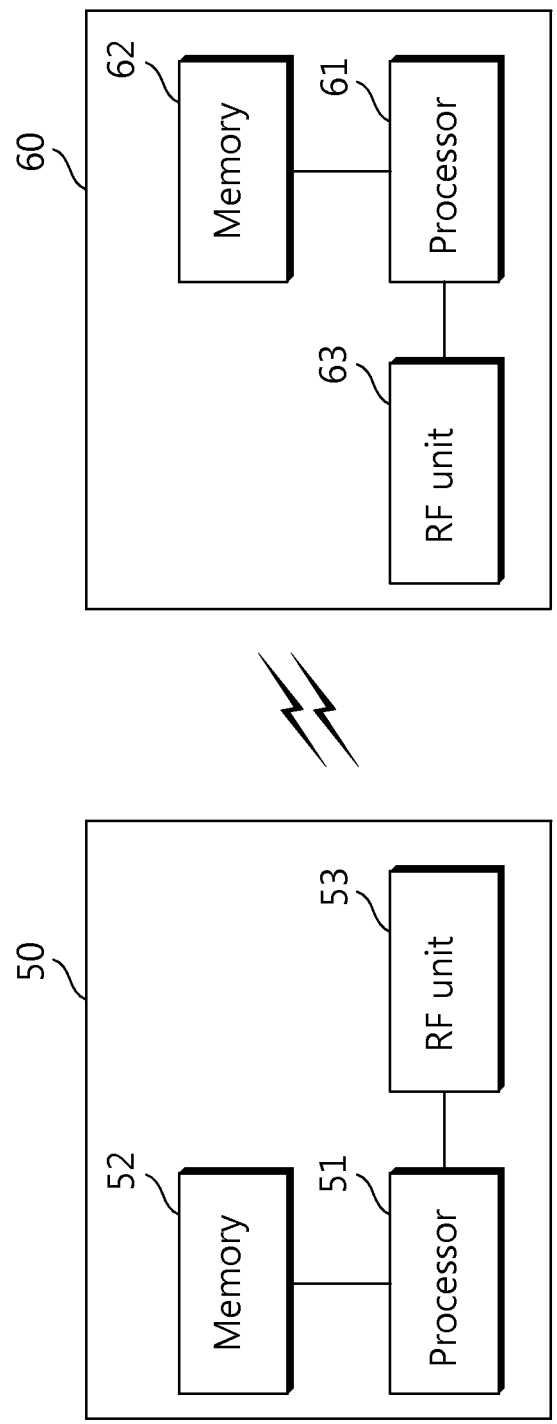
FIG. 16 is a block diagram showing a wireless communication system according to an embodiment of the present invention.

FIG. 16 is a block diagram of a wireless communication system according to an embodiment of the present invention.

ABS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, a serving cell and/or a TA group may be controlled/managed by the BS, and an operation of one or more cells may be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A communication method in a time division duplex (TDD)-based wireless communication system, the method comprising:
    receiving, by a wireless device, a configuration of a first special (S) subframe for a first cell to which a first timing advance (TA) is applied and a configuration of a second S subframe for a second cell to which a second TA is applied; and
    changing, by the wireless device, the configuration of at least one of the first S subframe and the second S subframe when a downlink (DL) reception and an uplink (UL) transmission overlap,
    wherein the first S subframe and the second S subframe include a downlink pilot time slot (DwPTS) and an uplink pilot time slot (UpPTS) respectively,
    determining whether a DwPTS in the first cell overlaps with a UpPTS in the second cell; and
    determining whether a start time for transmitting a UpPTS in the first cell is later than a start time for transmitting the UpPTS in the second cell;
    when it is determined that the DwPTS in the first cell overlaps with the UpPTS in the second cell and the start time for transmitting the UpPTS in the first cell is later than the start time for transmitting the UpPTS in the second cell, adjusting the start time for transmitting the UpPTS of the second cell to the start time for transmitting the UpPTS of the first cell,
    wherein adjusting the start time for transmitting the UpPTS of the second cell is performed autonomously by the wireless device on an OFDM symbol basis,
    wherein a size of the UpPTS in the first cell is different from a size of the UpPTS in the second cell,
    wherein the size of larger UpPTS in either the first or second cell is adjusted to the size of smaller UpPTS in other one of the first or second cell in order to avoid an overlap between the DL reception and the UL transmission, and
    wherein a transmission of a random access preamble or a sounding reference signal (SRS) is performed only in a last OFDM symbol in the size-adjusted UpPTS.

2. The method of claim 1, wherein changing the configuration comprises changing at least one of the size of the DwPTS and the size of the UpPTS.

3. The method of claim 1, further comprising transmitting, by the wireless device, information indicating the overlapping of the DL reception and the UL transmission.

4. A wireless device in a time division duplex (TDD)-based wireless communication system, the wireless device comprising:
    a radio frequency (RF) unit that transmits and receives radio signals; and
    a processor, operatively coupled to the RF unit, that:
    controls the RF unit to receive a configuration of a first special (S) subframe for a first cell to which a first timing advance (TA) is applied and a configuration of a second S subframe for a second cell to which a second TA is applied; and
    changes the configuration of at least one of the first S subframe and the second S subframe when a downlink (DL) reception and an uplink (UL) transmission overlap,
    wherein the first S subframe and the second S subframe include a downlink pilot time slot (DwPTS) and an uplink pilot time slot (UpPTS) respectively,
    determines whether a DwPTS in the first cell overlaps with a UpPTS in the second cell; and
    determines whether a start time for transmitting a UpPTS in the first cell is later than a start time for transmitting the UpPTS in the second cell;
    when it is determined that the DwPTS in the first cell overlaps with the UpPTS in the second cell and the start time for transmitting the UpPTS in the first cell is later than the start time for transmitting the UpPTS in the second cell, adjusts the start time for transmitting the UpPTS of the second cell to the start time for transmitting the UpPTS of the first cell,
    wherein adjusting the start time for transmitting the UpPTS of the second cell is performed autonomously by the wireless device on an OFDM symbol basis,
    wherein a size of the UpPTS in the first cell is different from a size of the UpPTS in the second cell,
    wherein the size of larger UpPTS in either the first or second cell is adjusted to the size of smaller UpPTS in other one of the first or second cell in order to avoid an overlap between the DL reception and the UL transmission, and
    wherein a transmission of a random access preamble or a sounding reference signal (SRS) is performed only in a last OFDM symbol in the size-adjusted UpPTS.

5. The wireless device of claim 4, wherein the processor further controls the RF unit to transmit information indicating the overlapping of the DL reception and the UL transmission.

* * * * *